United States Patent
Roberts et al.

(10) Patent No.: US 11,403,889 B2
(45) Date of Patent: Aug. 2, 2022

(54) PART MAINTENANCE AND VALUE ESTIMATION SYSTEM

(71) Applicant: Toyota Motor North America, Inc., Plano, TX (US)

(72) Inventors: Simon Roberts, Frisco, TX (US); Greg Luecht, The Colony, TX (US); Daniel Reaser, Carrollton, TX (US); Brandon Salahat, Plano, TX (US); Blake McMillan, Colleyville, TX (US); Angela Kanter, Murphy, TX (US)

(73) Assignee: TOYOTA MOTOR NORTH AMERICA, INC., Plano, TX (US)

(*) Notice: Subject to any disclaimer, the term of this patent is extended or adjusted under 35 U.S.C. 154(b) by 338 days.

(21) Appl. No.: 16/565,297

(22) Filed: Sep. 9, 2019

(65) Prior Publication Data
US 2021/0074080 A1 Mar. 11, 2021

(51) Int. Cl.
G07C 5/00 (2006.01)
B60W 40/09 (2012.01)
G07C 5/08 (2006.01)

(52) U.S. Cl.
CPC ............ G07C 5/006 (2013.01); B60W 40/09 (2013.01); G07C 5/0808 (2013.01); G07C 5/0816 (2013.01)

(58) Field of Classification Search
CPC .... G07C 5/006; G07C 5/0808; G07C 5/0816; G07C 5/0825; G07C 5/008; B60W 40/09
See application file for complete search history.

(56) References Cited

U.S. PATENT DOCUMENTS

| 6,370,454 | B1 | 4/2002 | Moore |
| 6,748,305 | B1 | 6/2004 | Klausner et al. |
| 8,310,356 | B2 | 11/2012 | Evans et al. |
| 8,874,305 | B2 | 10/2014 | Dolgov et al. |
| 9,454,855 | B2 | 9/2016 | Ahn et al. |
| 9,846,978 | B1 * | 12/2017 | Tseng ..................... G07C 5/008 |
| 9,858,730 | B2 | 1/2018 | Yturriaga-Trenor |
| 10,043,322 | B1 | 8/2018 | Kraft et al. |
| 10,109,218 | B2 | 10/2018 | Payne et al. |
| 10,132,373 | B2 | 11/2018 | Cousins et al. |

(Continued)

FOREIGN PATENT DOCUMENTS

| WO | 2009089600 A1 | 7/2009 |
| WO | 2017142536 A1 | 8/2017 |

Primary Examiner — Michael V Kerrigan
(74) Attorney, Agent, or Firm — Snell & Wilmer LLP

(57) ABSTRACT

Methods, systems, devices and apparatuses for a part lifecycle system. The part lifecycle system includes a part lifecycle apparatus. The part lifecycle apparatus includes a memory. The memory is configured to store multiple part profiles including a first part profile. The part lifecycle apparatus includes a sensor that is configured to determine performance data or lifecycle data of the first part. The part lifecycle apparatus includes an electronic control unit. The electronic control unit is configured to determine a baseline performance or a baseline lifecycle of the first part based on the first part profile. The electronic control unit is configured to determine that the performance data or the lifecycle data exceeds a threshold based on the baseline performance or the baseline lifecycle of the first part, respectively, and provide an indication to a user that the first part needs maintenance.

20 Claims, 5 Drawing Sheets

(56) References Cited

U.S. PATENT DOCUMENTS

2003/0187556 A1   10/2003  Suzuki
2011/0210837 A1    9/2011  Jin
2017/0308751 A1   10/2017  Kim et al.
2019/0120722 A1    4/2019  Wakasugi
2020/0391884 A1*  12/2020  Hawley .................. G07C 5/085

* cited by examiner

PART MAINTENANCE AND VALUE ESTIMATION SYSTEM

BACKGROUND

Field

This disclosure relates to tracking, maintaining, inventorying and ordering parts for vehicles.

Description of the Related Art

Often, dealerships and other service providers of vehicles operate using a just-in-time inventory system. That is, the ordering of the inventory is on an as-needed basis and the dealership or other service provider holds a minimal amount of inventory. This strategy helps companies lower their inventory carrying costs, increase efficiency and decrease waste. Thus, the just-in-time inventory system requires accurate forecasts in the demand of parts.

The just-in-time inventory system, however, relies on historical data and trends in the supply and demand of the part to identify when the part should be purchased. The historical data and/or trends may not be reflective of irregular or dynamic demand of the part that occurs as a result of unexpected occurrences, such as defects, and may not account for other variables, such as location, weather and/or other unique characteristics, such as driver behavior patterns. Moreover, the just-in-time inventory system does not recognize relationships and patterns across various maintenance needs for multiple vehicles across multiple locations.

Accordingly, there is a need for a system and method to proactively source parts when needed and identify trends of the various maintenance needs of multiple parts for multiple vehicles.

SUMMARY

In general, one aspect of the subject matter described in this disclosure may be embodied in a part lifecycle apparatus. The part lifecycle apparatus includes a memory. The memory is configured to store multiple part profiles including a first part profile for a first part. The part lifecycle apparatus includes a sensor. The sensor is configured to determine performance data or lifecycle data of the first part. The part lifecycle apparatus includes an electronic control unit. The electronic control unit is coupled to the memory and the sensor. The electronic control unit is configured to determine a baseline performance or a baseline lifecycle of the first part based on the first part profile. The electronic control unit is configured to determine that the performance data or the lifecycle data exceeds a threshold based on the baseline performance or the baseline lifecycle of the first part, respectively. The electronic control unit is configured to provide an indication to a user that the first part needs maintenance.

These and other embodiments may optionally include one or more of the following features. The part lifecycle apparatus may include a second sensor. The second sensor may be configured to measure or detect performance data or lifecycle data of a second part. The multiple part profiles may include a second part profile for the second part. The electronic control unit may be configured to determine that the measured or detected performance data or the lifecycle data of the second part exceeds a second threshold based on a baseline performance or a baseline lifecycle of the second part. The electronic control unit may be configured to provide a second indication to the user that the second part needs maintenance.

The electronic control unit may be configured to provide the indication that the first part needs maintenance to a service provider. The electronic control unit may be configured to cause the service provider to order the first part or schedule an appointment for the user. The electronic control unit may be configured to determine driver behavior patterns of a driver of the vehicle and may provide additional information including a location of the vehicle, vehicle identification information and the driver behavior patterns of the driver of the vehicle to the service provider.

The lifecycle data may include an age of the first part. The baseline lifecycle may include a replacement age for the first part. The electronic control unit may be configured to determine that the lifecycle data exceeds the threshold when the age of the first part is greater than or equal to the replacement age for the first part. The performance data may include a temperature, an air pressure or a rate or speed of the first part. The baseline performance may include a temperature range, an air pressure range or a rate or speed range of the first part. The electronic control unit may be configured to determine that the temperature, the air pressure or the rate or speed of the first part exceeds the temperature range, the air pressure range or the rate or speed range, respectively, of the first part.

In another aspect of the subject matter may be embodied in a method for maintaining parts of a vehicle. The method includes determining, by an electronic control unit and using a sensor, performance data or lifecycle data of a first part of the vehicle. The method includes determining, by the electronic control unit, a baseline performance or a baseline lifecycle of the first part based on a first part profile. The method includes determining, by the electronic control unit, that the performance data or the lifecycle data exceeds a threshold based on the baseline performance or the baseline lifecycle of the first part, respectively. The method includes providing, by the electronic control unit, an indication to a user that the first part needs maintenance.

In another aspect, the subject matter may be embodied in a part lifecycle platform. The part lifecycle platform includes a memory. The memory is configured to store multiple indications of multiple parts that need to be replaced. The part lifecycle platform includes a processor. The processor is coupled to the memory and configured to obtain the multiple indications of the multiple parts that need to be replaced. The processor is configured to determine a relationship or pattern among the multiple indications. The processor is configured to diagnose a maintenance or design issue based on the relationship or pattern among the multiple indications. The processor is configured to provide the diagnosis to a service provider or a user.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Disclosed herein are systems, apparatuses, platforms and methods for determining when a part or component ("part") of a vehicle needs to be replaced, fixed, maintained or otherwise serviced and alerting the driver of the vehicle of the need to have the part on the vehicle serviced. Particular embodiments of the subject matter described in this disclosure may be implemented to realize one or more of the following advantages. The part lifecycle management and inventory system ("part lifecycle system") monitors the performance and lifecycle of individual parts of the vehicle and determines and/or predicts when the part needs to be replaced, fixed, maintained or otherwise serviced due to obsolescence, defect, damage and/or routine wear and tear. The party lifecycle system alerts the user of the vehicle when the part needs to be replaced, fixed, maintained or otherwise serviced before the part needs to be replaced, fixed, maintained or otherwise serviced. This assists the user in identifying potential maintenance and defect issues before the part fails and improves the overall performance and life of the vehicle, which may result in lower lifetime vehicle costs.

Other benefits and advantages include the capability to proactively source the part when needed and schedule service appointments. The part lifecycle system may identity when the part needs to be replaced, fixed, maintained or otherwise serviced and schedule an appointment for the driver with a preferred service provider. Moreover, the part lifecycle system may pre-order the part so that when the driver arrives at the service provider, the part will be available to be replaced, if necessary. This allows the service provider to maintain a low inventory of parts at the service center, which reduces costs, and prevents any unnecessary waiting or additional trips to the service center by the vehicle owner.

Additionally, the part lifecycle system may inventory all parts replaced, fixed, maintained or otherwise serviced during the lifetime of the vehicle and provide a more accurate estimation or valuation of the vehicle. By having the updated vehicle service record, a more accurate estimation or valuation of the vehicle may be determined. Moreover, by aggregating the parts replaced, fixed, maintained or otherwise serviced from multiple vehicles in multiple locations, the part lifecycle system may draw inferences, such as any additional defects, unexpected wear and tear or other trends and relationships, from the aggregated data. This provides the service center the ability to better diagnose macro-level trends or root causes of potential issues across multiple vehicles in addition to the micro-level issues of the part for the specific vehicle.

Figure 1:
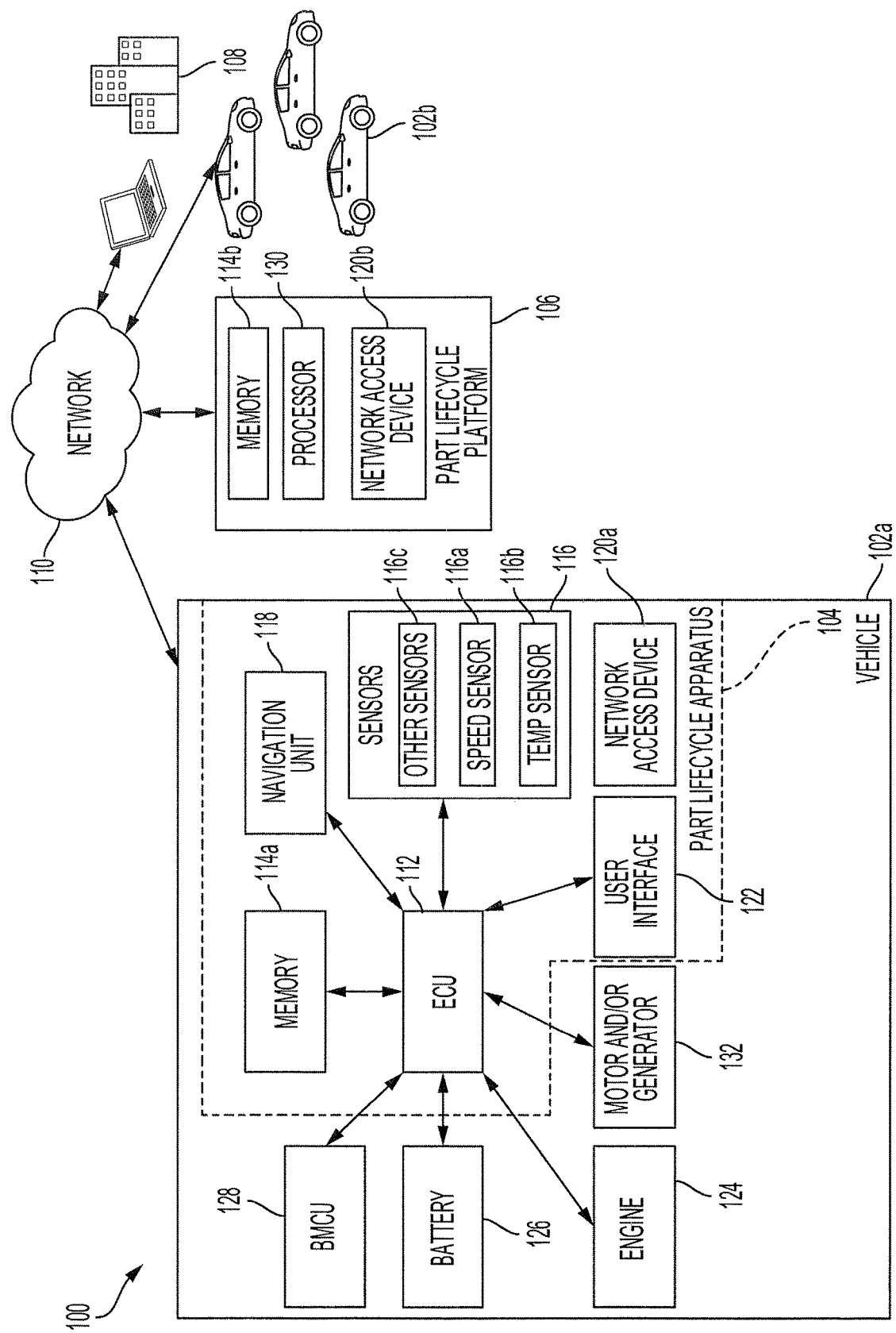
FIG. 1 is a block diagram of an example part lifecycle system according to an aspect of the invention.

FIG. 1 is a block diagram of a part lifecycle system 100. The part lifecycle system 100 may include a part lifecycle apparatus 104 and/or a part lifecycle platform 106. The part lifecycle platform 106 may be a separate platform coupled to the part lifecycle apparatus 104 and/or its functions may be included within the part lifecycle apparatus 104. The part lifecycle apparatus 104 may be retro-fitted, coupled to, include or be included within a vehicle 102a-b or may be entirely separate and remote from the vehicle 102a-b. The part lifecycle system 100 may couple, connect to, or include other part lifecycle apparatuses 104 on other vehicles 102b and/or one or more computing devices, such as a server, a tablet, a laptop, a wearable device or other computing device, of one or more service providers 108, such as a dealership or manufacturer. The part lifecycle system 100 may have a network 110 that links the part lifecycle apparatus 104, the part lifecycle platform 106, the other part lifecycle apparatuses 104 on other vehicles 102b (hereinafter, referred to as "other vehicles 102b"), and/or the one or more computing devices of one or more service providers (hereinafter, referred to as "service providers") 108. The network 110 may be a Dedicated Short-Range Communication (DSRC) network, a local area network (LAN), a wide area network (WAN), a cellular network, the Internet, or combination thereof, that connects, couples and/or otherwise communicates among the vehicles 102a-b, the one or more service providers 108, the part lifecycle platform 106 and/or the part lifecycle apparatus 104.

The part lifecycle system 100 determines when the performance of parts on a vehicle 102a-b have degraded or the parts have reached the end of their lifecycle and need to be maintained, fixed, replaced or otherwise serviced (hereinafter, referred to as being "serviced") to maintain vehicle efficiency and prevent damage to the vehicle 102a-b and/or danger to the passengers within the vehicle 102a-b. The part lifecycle system 100 may analyze various parts of the vehicle 102a-b including one or more wheels or tires, the brakes, the accelerator, the ignition system, the heating ventilation and air conditioning (HVAC) unit, the suspension system, the electronics, the lighting, the engine, the fuel cell system and/or other parts of the vehicle 102a-b to determine whether the part needs to be serviced. In order to determine whether the part needs to be serviced, the part lifecycle system 100 collects and obtains parameters or metrics of the performance data and/or lifecycle data.

The part lifecycle system 100 alerts the driver or a service provider when one or more parts need to be serviced. Moreover, the part lifecycle system 100 may aggregate and collet data from multiple vehicles and use artificial intelligence to determine trends or relationships that indicate design defects in the one or more parts and/or diagnose a macro-level root cause of abnormal wear and tear or damage to the one or more parts.

The part lifecycle system 100 includes a part lifecycle apparatus 104 and part lifecycle platform 106. The part lifecycle apparatus 104 uses sensors to monitor components on the vehicle 102a-b to collect sensor data that includes metrics, such as performance metrics and/or lifecycle metrics, of the one or more parts of the vehicle 102a-b. The part lifecycle apparatus 104 and/or the part lifecycle platform 106 may perform the analysis to determine whether a part needs to be serviced and alert the user or service provider of the need for the service. The part lifecycle platform 106 may perform a macro-level analysis of the parts that are serviced from multiple vehicles in multiple locations and identify root cause issues and/or defects that may be related to the need to service the various parts from the multiple vehicles.

The part lifecycle apparatus 104 may include or be retro-fitted or otherwise coupled with the one or more vehicles 102a-b. A vehicle 102a-b is a conveyance capable of transporting a person, an object, or a permanently or temporarily affixed apparatus. The vehicle 102a-b may be a self-propelled wheeled conveyance, such as a car, a sports utility vehicle, a truck, a bus, a van or other motor, battery or fuel cell driven vehicle. For example, the vehicle 102a-b may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102a-b may be semi-autonomous or autonomous. That is, the vehicle 102a-b may be self-maneuvering and navigate without human input. An autonomous vehicle may have and use one or more sensors and/or a navigation unit to drive autonomously.

The part lifecycle apparatus 104 includes one or more processors, such as an electronic control unit (ECU) 112, and a memory 114a. The part lifecycle apparatus 104 may include or be coupled to other components, such as a navigation unit 118, one or more sensors 116 or a network access device 120a, and/or a user interface 122. The part lifecycle apparatus 104 may couple, connect to, and/or include one or more vehicle components such as the motor and/or generator 132, the engine 124, the battery 126, and/or the battery management control unit (BMCU) 128. The part lifecycle apparatus 104 may not necessarily include the other components and/or the vehicle components, but rather, the part lifecycle apparatus 104 may be coupled to the other components and/or the vehicle components.

The electronic control unit (ECU) 112 may be implemented as a single processor or as multiple processors. The ECU 112 may be electrically coupled to some or all the other components within the vehicles 102a-b. The ECU 112 may include one or more controllers designed for collecting and analyzing data to identify, detect and/or determine when a part needs to be serviced, and in response, act to alert, warn or otherwise inform the owner of the vehicle 102a-b and/or the service provider. The ECU 112 may be coupled to a memory 114a and execute instructions that are stored in the memory 114a.

Similarly, the part lifecycle platform 106 has one or more processors 130, which may be implemented as a single processor or as multiple processors. The one or more processors 130 are designed to analyze the different parameters, such as location, weather and/or driver behavior patterns and assess impact that these parameters have on the performance and/or lifecycle of a part and when the part needs to be serviced. Moreover, the one or more processors 130 are designed to determine relationships and patterns among the various parts of the multiple vehicles that need to be serviced to identify macro-level issues, such as root causes of failures, design defects and/or premature obsolescence. The processor 130 may generate or obtain predictive baseline models ("baseline") and use machine learning algorithms to improve the assessment of macro-level issues.

The part lifecycle apparatus 104 and the part lifecycle platform 106 have a memory 114a-b, respectively. The memory 114a-b may be coupled to the ECU 112 and the processor 130, respectively, and store instructions that the ECU 112 and the processor, respectively, executes. The memory 114a-b may include one or more of a Random Access Memory (RAM), Read Only Memory (ROM) or other volatile or non-volatile memory. The memory 114a-b may be a non-transitory memory or a data storage device, such as a hard disk drive, a solid-state disk drive, a hybrid disk drive, or other appropriate data storage, and may further store machine-readable instructions, which may be loaded and executed by the ECU 112 and/or the processor 130.

The part lifecycle apparatus 104 may include a user interface 122. The part lifecycle apparatus 104 may receive user input via the user interface 122. For example, the user interface 122 may receive user input, such as a login/password or other user credential, which identifies the driver of the vehicle 102. The user interface 122 may be used confirm the replacement, maintenance or other service of one or more parts of the vehicle 102a-b.

The user interface 122 may include an input/output device that receives user input from a user interface element, a button, a dial, a microphone, a keyboard, or a touch screen. The user interface 122 may provide an output to an output device, such as a display, a speaker, an audio and/or visual indicator, or a refreshable braille display. The output device may display an alert or notification to service the one or more parts of the vehicle 102a-b.

The part lifecycle apparatus 104 and/or the part lifecycle platform 106 may have one or more network access devices 120a-b, respectively. The one or more network access devices 120a-b may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access devices 120a-b may transmit data to and receive data from the different components of the part lifecycle system 100 including the one or more vehicles 102a-b, the part lifecycle apparatus 104, the part lifecycle platform 106 and/or the one or more service providers 108. For example, the processor 130 may obtain sensor data and/or indications that various parts need to be replaced from multiple vehicles 102a-b and may alert the passenger of the vehicle 102a-b, alert the service provider 108 and/or order a part or schedule an appointment with the service provider 108 for the vehicle 102a-b.

The part lifecycle apparatus 104 may include a navigation unit 118. The navigation unit 118 may be integral to the vehicle 102a or a separate unit coupled to the vehicle 102a, such as a navigation unit within a user device. The vehicle 102a may include a Global Positioning System (GPS) unit (not shown) for detecting location data including a current location of the vehicle 102a and date/time information instead of the navigation unit 118. In that regard, the ECU 112 may perform the functions of the navigation unit 118 based on data received from the GPS unit. The navigation unit 118, or the ECU 112 may perform navigation functions. Navigation functions may include, for example, route and route set prediction, providing navigation instructions, and receiving user input such as verification of predicted routes and route sets or destinations. Other information, such as a current speed of the vehicle 102a and/or a current direction of travel of the vehicle 102a, may be extrapolated, interpreted or otherwise calculated from the data obtained from the navigation unit 118.

The navigation unit 118 may provide and/or obtain navigational map information including a current time and/or location data, which may include a current location, a starting location, a destination location and/or a route between the starting location or current location and the destination location of the vehicle 102a. The navigation unit 118 may include a memory (not shown) for storing the route data. The navigation unit 118 may receive data from other sensors capable of detecting data corresponding to location information. For example, the other sensors may include a gyroscope or an accelerometer.

The one or more sensors 116 measure, detect or otherwise determine or obtain sensor data that includes the performance data and/or the lifecycle data of the one or more parts of the vehicle 102a-b. The one or more sensors 116 may include a speed sensor 116a. The speed sensor 116a may measure the revolutions per minute, compression speed or movement speed of a part, such as the wheel, an air compressor or the engine belt, or flow through the part, such as air flow, coolant flow, refrigerant flow or other liquid or gas flow through the HVAC unit, hydraulic system or fuel cell system. The one or more sensors 116 may include a temperature sensor 116b. The temperature sensor 116b may measure the temperature of a liquid or gas flowing through a part, such as the oil temperature through the engine, the air flow temperature through the fuel cell system and/or the temperature of liquids and/or gases through the HVAC unit. Other sensors 116c may include a pressure sensor, such as the tire pressure monitoring system to measure the tire pressure, and/or a tread depth sensor to measure the treads of a wheel. The other sensors 116c may also include various sensors to measure the throttle position, the catalyst temperature, the exhaust pressure and/or fuel rates. For example, a camera may be used to capture an image of the tread depth and the image may be analyzed to determine the tread depth.

The one or more other sensors 116c may be used to measure other metrics related to the lifecycle of the part. For example, a sensor, such as a timer, may be used to track the length of time that a part was last replaced. The length of time may be based on the amount of actual time that has elapsed since the last service or the distance that the vehicle 102a has travelled since the part was last serviced.

The sensors 116 may be used to monitor driver behavior patterns. For example, the speed sensor 116a may measure the amount of rotation of the multiple wheels to determine changes in speed, such as excessive speeding or an uncharacteristic slowing of the vehicle 102a. The other sensors 116c may include a steering wheel sensor, a brake sensor and/or an acceleration sensor. The steering wheel sensor may measure the amount and rate of change of the steering. The brake sensor may measure an amount of depression and/or a rate of depression of a brake pedal of the vehicle 102a. The acceleration sensor may measure an amount of depression and/or a rate of depression of an accelerator pedal of the vehicle 102a.

The part lifecycle system 100 may couple, connect to, and/or include one or more parts 134 including one or more vehicle components. The one or more parts 134 may include one or more doors, one or more windows, a windshield, an air conditioning unit and/or one or more other vehicle components. The one or more vehicle components may include a motor and/or generator 132. The motor and/or generator 132 may convert electrical energy into mechanical power, such as torque, and may convert mechanical power into electrical energy. The motor and/or generator 132 may be coupled to the battery 126. The motor and/or generator 132 may convert the energy from the battery 126 into mechanical power, and may provide energy back to the battery 126, for example, via regenerative braking. The vehicle 102a may include one or more additional power generation devices such as the engine 124 or a fuel cell stack (not shown). The engine 124 combusts fuel to provide power instead of and/or in addition to the power supplied by the motor and/or generator 132.

The battery 126 may be coupled to the motor and/or generator 132 and may provide electrical energy to and receive electrical energy from the motor and/or generator 132. The battery 126 may include one or more rechargeable batteries.

The BMCU 128 may be coupled to the battery 126 and may control and manage the charging and discharging of the battery 126. The BMCU 128, for example, may measure, using battery sensors, parameters used to determine the state of charge (SOC) of the battery 126. The BMCU 128 may control the battery 126.

The part lifecycle system 100 may include one or more part lifecycle apparatuses 104 coupled to or included on one or more other vehicles 102b. The one or more other vehicles 102b provide sensor data and/or other indications of when a part needs to be serviced to the part lifecycle platform 106 to identify patterns and relationships that may diagnose macro-level issues. Moreover, the part lifecycle system 100 may include one or more computing devices, such as a laptop, a server, a tablet or other personal device, of one or more service providers 108. The one or more service providers 108 may also provide information to the part lifecycle platform 106 to assist in diagnosing macro-level issues. Moreover, the one or more service provider 108 may order parts and/or schedule appointments based on indications that the service provider 108 is a preferred provider of an owner of a vehicle 102a-b and that a part on the vehicle 102a-b needs to be serviced. The one or more service providers 108 may be a dealership, a mechanic, a body shop or other service center.

Figure 2:
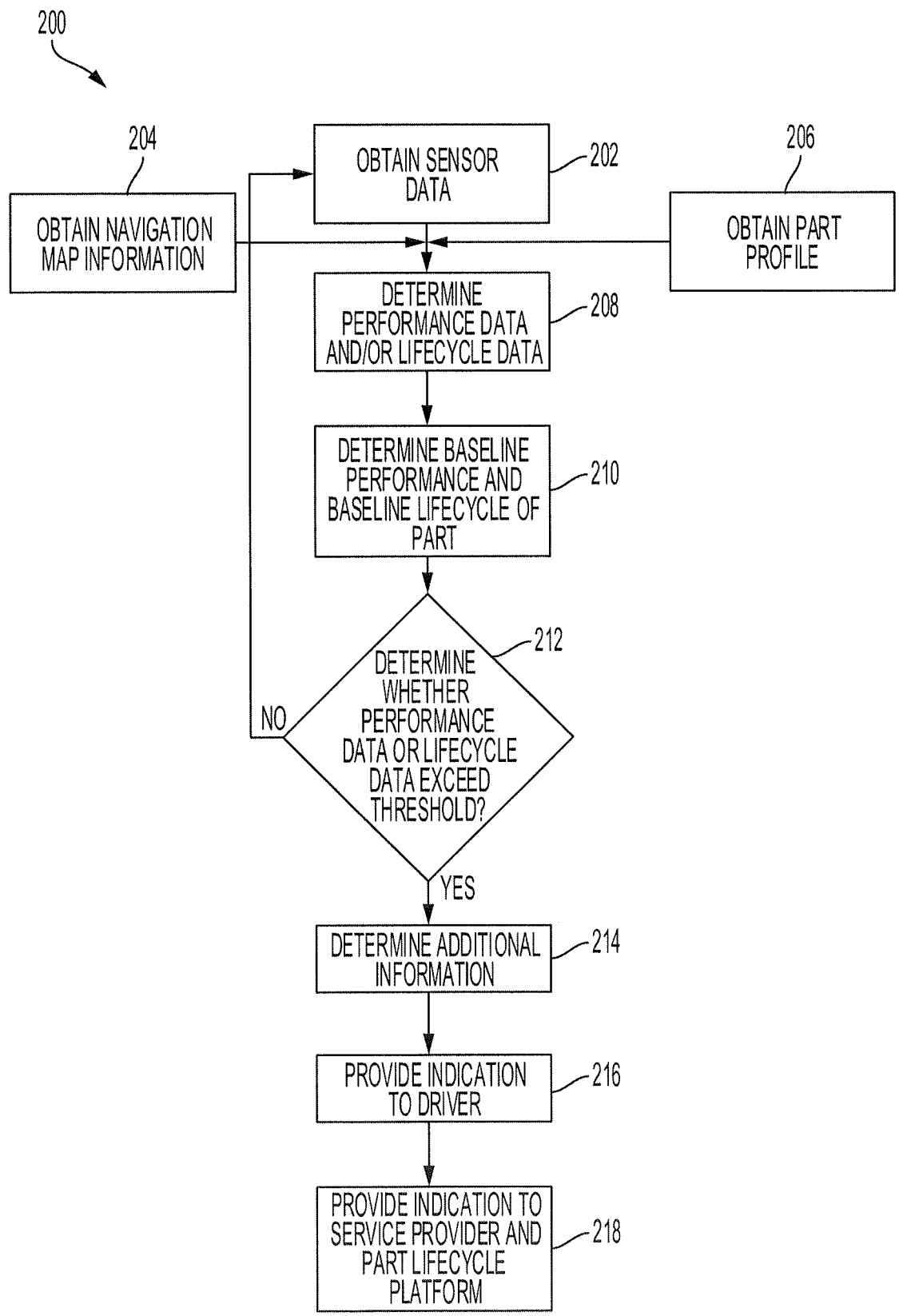
FIG. 2 is a flow diagram of an example process for alerting the driver and/or the service provide that one or more parts of the vehicle need to be serviced using the part lifecycle system of FIG. 1 according to an aspect of the invention.

FIG. 2 is a flow diagram of a process 200 for alerting the driver and/or the service provider that one or more parts of the vehicle 102a need to be serviced. One or more computers or one or more data processing apparatuses, for example, the ECU 112 of the part lifecycle apparatus 104 of the part lifecycle system 100 of FIG. 1, appropriately programmed, may implement the process 200. The process 200 may be repeated for multiple parts including a first part, a second part and/or a third part, which may all be different parts of the same vehicle 102a-b or various parts of multiple other vehicles.

The part lifecycle system 100 includes a part lifecycle apparatus 104. The part lifecycle apparatus 104 obtains sensor data (202). The part lifecycle apparatus 104 may obtain the sensor data for various parts of the vehicle 102a. The part lifecycle apparatus 104 obtains the sensor data using one or more sensors 116. The one or more sensors 116 measure, detect or otherwise determine various metrics of the various parts that relate to the performance (or "performance data") and/or the lifecycle (or "lifecycle data") of the various parts. The performance data and/or the lifecycle data may be later compared to an expected value or range, such as a baseline value or range, to determine the state of the part and whether the part needs to be serviced.

The performance data may include a speed of the part, such as the speed of a belt, the tread depth of a tire, the depth of the brake pads, the temperature, such as the temperature of the battery, engine or air or coolant within the HVAC unit or the fuel cell system, a pressure, such as an air pressure ration of a compressor, a level, such as the level of the oil or fuel or other parameter that indicates the performance of the part. The lifecycle data may include an amount of time since the part was replaced, checked or otherwise serviced, a number of ignition cycles or a number of miles traversed using the part since it was serviced and/or another metric such as the number of revolutions or hours since the last service.

The part lifecycle apparatus 104 may also obtain sensor data to monitor driver behavior patterns. The one or more sensors 116 may measure, detect or otherwise determine characteristics of a driver's behavior patterns to be provided to the part lifecycle platform 106. For example, the part lifecycle apparatus 104, may measure the actual or change in the vehicle speed, the change or rate of change of the steering wheel angle, and/or the change or rate of depression of the brakes or the accelerator, which may affect the wear and tear to various parts of the vehicle 102a and cause the need for the various parts to be serviced sooner than expected. For example, a driver who slams on the brakes is more likely to quickly put wear and tear on the brake pads, and so, the brake pads may become more worn and not last as long as brake pads of a vehicle where the driver slowly depresses the brakes when stopping.

Figure 3:
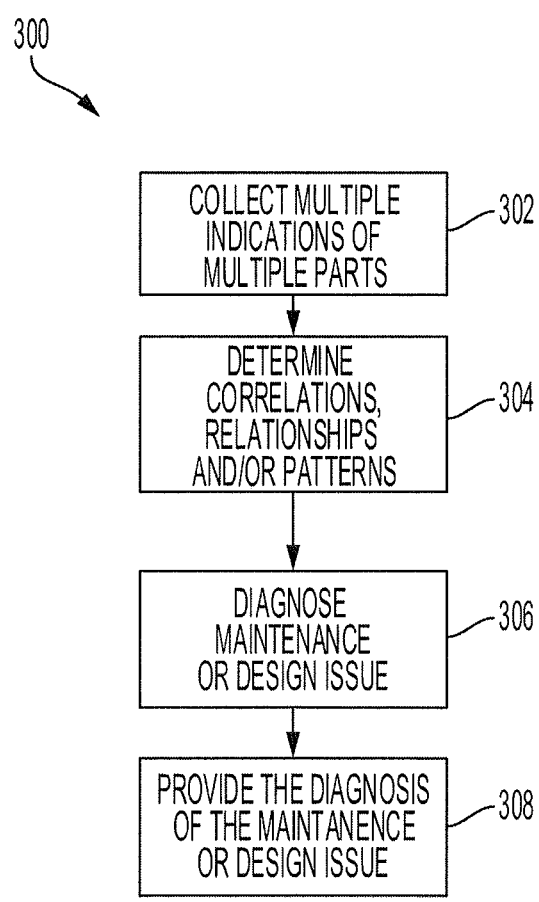
FIG. 3 is a flow diagram of an example process for determining or diagnosing macro-level issues regarding the servicing of one or more parts of the vehicle using the part lifecycle system of FIG. 1 according to an aspect of the invention.

The part lifecycle apparatus 104 may obtain navigational map information (204). The navigational map information may include a current location of the vehicle 102a-b and/or a history of numerous trips of the vehicle 102a including a start location, a destination location and any intermediary locations for the numerous trips. The navigational map information provides a history of the where the vehicle 102a-b has traversed, which may indicate the type of terrain and/or roadways and the amount of travel the part has endured between services. The location information may be provided to the part lifecycle platform 106 to obtain a more accurate part profile for comparison to provide a more accurate estimation or prediction of when the part needs to be serviced. Moreover, the navigational map information may be used to develop and address macro-level issues, such as the cause and amount of wear and tear on parts across different regions. FIG. 3 further describes the process 300 for determining or diagnosing macro-level issues regarding the servicing of one or more parts of the vehicle 102a-b.

The part lifecycle apparatus 104 obtains a part profile (206). The part profile may include various metrics, characteristics and/or parameters that relate to the performance and/or lifecycle of the part for the particular vehicle. The various metrics, characteristics and/or parameters depends on the part. The various metrics may describe performance data, such as a range of operational speeds that the part operates at, a temperature range that the part effectively operates at and/or an air pressure ratio range that the part effectively operates at. The metrics relate to hardware limitations of the part. The various characteristics may relate to lifecycle data, such as a meantime to repair, replace or otherwise service the part and/or obsolescence timeframe for the part. In essence, the part profile provides a baseline or an expected performance and/or lifecycle of the part.

The part lifecycle apparatus 104 may obtain the part profile from the memory 114a. The part profile may be periodically updated by receiving an updated part profile from the part lifecycle platform 106, which may analyze multiple similar parts across various drivers and vehicles 102a-b. The updated part profile may reflect baseline models that model the degradation in the performance and/or lifecycle of the part on multiple vehicles due to various driver behavior patterns or other factors, such as location. For example, the updated part profile may update the specific part profile associated with the vehicle 102a to indicate that the brake pads only last approximately 30,000-40,000 miles because the driver behavior patterns of the driver indicate that the driver slams on the brakes, instead of over 50,000 miles under normal braking conditions.

For example, for an engine belt, the part profile may indicate the number of revolutions that that the engine belt can endure before being worn out or the number of miles that the vehicle 102a may run before the engine belt needs to be replaced. In another example, for an engine belt, the part profile may indicate that the engine belt may operate at a particular range of speed.

The part lifecycle apparatus 104 determines the performance data and/or the lifecycle data for each of the one or more parts of the vehicle 102a (208). For each of the one or more parts of the vehicle 102a, the part lifecycle apparatus 104 may extract the corresponding performance data and/or lifecycle data from the sensor data. For example, the part lifecycle apparatus 104 determines the speed, the pressure, the temperature and/or other metric that corresponds to the part from the sensor data and determines the current performance of the part. In another example, the part lifecycle apparatus 104 determines the last time the part was serviced, such as when it was last repaired or replaced, in terms of time, the amount of miles the vehicle 102a has traversed or other factor, and determines the current lifecycle of the part. The part lifecycle apparatus 104 may use a separate log book or an indicator within the part profile to track when the part was last serviced along with the speedometer, internal clock or other timer to measure the length of time that has elapsed when the part was last serviced. For example, the part lifecycle apparatus 104 may timestamp when the part was last serviced or record the mileage of when the part was last serviced in the part profile and compare the timestamp to the current time or the recorded mileage to the current mileage to determine the elapsed time or mileage of last service.

The part lifecycle apparatus 104 determines a baseline performance and/or a baseline lifecycle of the part (210). The part lifecycle apparatus 104 may determine the baseline performance and/or the baseline lifecycle of the part based on the part profile. For each of the one or more parts, the part lifecycle apparatus 104 may extract the expected metrics for the performance of the part and/or the expected characteristics and/or parameters for the lifecycle of the part as the baseline performance and/or the baseline lifecycle, respectively, expected of the part.

The part lifecycle apparatus 104 determines whether the performance data and/or the lifecycle data exceeds a performance and/or lifecycle threshold (212). The thresholds may be the baseline performance and/or the baseline lifecycle of the part, respectively. The part lifecycle apparatus 104 may compare the performance data with the baseline performance and the lifecycle data with the baseline lifecycle of the part.

For example, the part lifecycle apparatus 104 may compare the speed of a part, the temperature of air or liquid flow through a part, the pressure of the air or liquid flow through the part or other metric related to the performance of a part with the baseline performance, which may be a range for the metric, such as a speed, temperature or pressure range for the operation of the part that does not exceed the operational limits of the part. In another example, the part lifecycle apparatus 104 may compare the amount of time since the part was last serviced and/or the distance that has been traversed by the vehicle 102a since the part was last serviced with the baseline lifecycle, which may be a range or approximation for the characteristic or parameter, such as an estimated mileage or time to when the part needs to be serviced.

The part lifecycle apparatus 104 may determine that the performance data exceeds the performance threshold when the metric for the performance data, e.g., the speed, the temperature, the pressure ratio, the tread depth or other metric is outside an operational range. For example, the part lifecycle apparatus 104 may determine that the speed of the air compressor, belt or other part is greater than an operational range for the part. The part lifecycle apparatus may determine that the lifecycle data exceeds the lifecycle threshold when the characteristic or parameter for the lifecycle data, e.g., the age of the part, is greater than or equal to an expected service age, obsolescence age or mean time to replace age for the part.

If the performance data and/or the lifecycle data does not exceed the threshold, the part lifecycle apparatus 104 continues to obtain and monitor the sensor data of the parts of the vehicle 102*a* (202). Otherwise, if the performance data and/or the lifecycle data for the part exceeds the performance and/or lifecycle threshold, respectively, the part lifecycle apparatus 104 may determine additional information related to the performance and/or lifecycle degradation of the part (214).

The part lifecycle apparatus 104 may also determine additional information, such as the location of the vehicle 102*a*, the driver behavior patterns and/or the history of trips of the vehicle 102*a*, from the navigational map information and/or the sensor data. The additional information may also include a vehicle identification number (VIN) or other identifier of the vehicle 102*a*. The additional information, such as the history of trips or the location of the vehicle 102*a*, may be extracted from the navigational map information and/or may be interpolated from the sensor data, such as the driver behavior patterns including whether the driver brakes hard, accelerates quickly and/or otherwise drives erratically.

The part lifecycle apparatus 104 may provide an indication to the user that the part needs to be serviced (216). The indication may include the part that needs to be serviced and/or whether the part that needs to be serviced is a result of degrading performance and/or at or near the end of its lifecycle. The indication may include the additional information. The part lifecycle apparatus 104 may direct the user to a preferred service provider to service the part and provide the indication and/or the additional information to the user so that a diagnosis of the degradation of the part may be determined.

The part lifecycle apparatus 104 may provide the indication and/or the additional information also to the service provider 108 and/or the part lifecycle platform 106 (218). The indication may include the name of the owner of the vehicle 102*a* and/or vehicle identification information of the vehicle 102*a*, such as the VIN, make, model and/or current mileage of the vehicle 102*a*. By providing the indication and/or additional information to the service provider 108, the service provider may pre-order parts and/or schedule appointments for the vehicle 102 in advance. Moreover, part lifecycle platform 106 may diagnose a root cause of the issues with the part along with identify any macro-issues, such as part defects, across multiple vehicles. The part lifecycle apparatus may display or cause the indication and/or the additional information to be presented to the user or the service provider, via the user interface 122 and/or the computing device of the service provider 108, respectively. The preferred service provider may be determined from a profile, such as a driver profile or a vehicle owner profile, that corresponds to the vehicle 102*a*. The profile may be configured via the user interface 122 or a personal device and/or linked when the vehicle 102*a* first visits the service provider 108 and stored in the memory 114*a*.

FIG. 3 is a flow diagram of a process 300 for diagnosing macro-level issues of various parts of various vehicles. One or more computers or one or more data processing apparatuses, for example, the processor 130 of the part lifecycle platform 106 of the part lifecycle system 100 of FIG. 1, appropriately programmed, may implement the process 300.

The part lifecycle platform 106 aggregates or collects multiple indications of multiple parts that need to be serviced from multiple vehicles 102*a-b* (302). Since the aggregated indications includes indications from multiple driver of multiple vehicles in various locations, the part lifecycle platform 106 is able to analyze the correlations of the various failures of various parts across multiple vehicles. This assists the part lifecycle platform 106 in identifying cascading failure of parts, which may identify root causes, such as defects, of the various service issues.

The part lifecycle platform 106 determines correlations, relationships and/or patterns within the aggregated and collected indications of the parts that need to be serviced (304). The part lifecycle platform 106 tracks the frequency and/or the number of times that a particular part needs to be serviced along with any subsequent servicing of other parts and previously identified root-causes. For example, a battery 126 check may be followed up with an alternator check and/or a software check when an issue with the battery 126 is not resolved upon doing a battery 126 check based on the number of occurrences of the indications that the failure of the alternator follows the failure of the battery 126.

Once the correlations, relationships, patterns and/or trends are determined, the part lifecycle platform 106 may diagnose the maintenance or design issue based on the correlations, relationships, patterns and/or trends (306). For example, when an indication is obtained that indicates that the air flow within the passenger cabin is not cool enough, the part lifecycle platform 106 may determine that this is often related to an air filter that is dirty and clogged. Subsequently, the most likely part to check next is the refrigerant hose because the refrigerant hose is often the problem identified from other vehicles 102*a-b* with a similar issue. When the air filter is clean, but the temperature remains above normal, the part lifecycle platform 106 may determine that a subsequent cause in most cases involves the leaking refrigerant hose based on the patterns and/or trends in other vehicles 102*a-b*. In another example, when the indication indicates that the battery 126 is without a state of charge, the part lifecycle platform 106 may first suggest replacing the battery 126, and if there are subsequent problems, the part lifecycle platform 106 may suggest servicing the alternator because that was the most prevalent secondary issue in other vehicles 102*a-b* based on the correlations, relationships, patterns and/or trends. Additionally, if there are further issues, the part lifecycle platform 106 may identify that in this particular type of vehicle 102*a-b*, the heads-up display may be unintentionally draining the battery 126. The part lifecycle platform 106 may provide the diagnosis of the maintenance or design issue to the service provider 108, e.g., via a user interface on a computing device (308).

Figure 4:
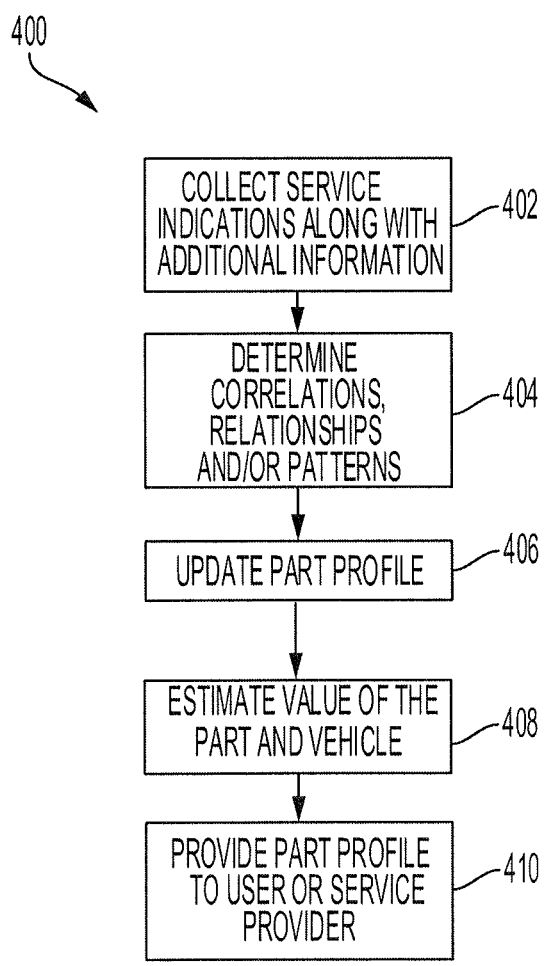
FIG. 4 is a flow diagram of an example process for updating the part profile using the part lifecycle system of FIG. 1 according to an aspect of the invention.

FIG. 4 is a flow diagram of a process 400 for updating the part profile. One or more computers or one or more data processing apparatuses, for example, the processor 130 of the part lifecycle platform 106 of the part lifecycle system 100 of FIG. 1, appropriately programmed, may implement the process 400.

The part lifecycle platform 106 aggregates or collects service indications along with the additional information of the part that needs to be serviced from multiple drivers of multiple vehicles in various locations (402). Since the aggregated information or data includes data from multiple drivers of multiple vehicles, the part lifecycle platform 106 is able to analyze the effects of various driver behavior patterns on the various parts over the lifecycle of the part. Moreover, since the data is collected across multiple vehicles, the various parts may degrade differently for different models and types of vehicles 102*a-b*. Additionally, since the data is collected from various locations, the part lifecycle platform 106 may identify the effects that the location has on the performance and/or lifecycle of various parts. For example, weather in the various locations may affect the performance and/or lifecycle of the various parts.

The part lifecycle platform 106 determines correlations, relationships and/or patterns within the aggregated and collected additional information and the indications of the parts that need to be serviced (404). The part lifecycle platform 106 tracks the frequency and/or the number of times that a particular part needs to be serviced along with the associated additional information related to the particular part, such as the location or the time the information was collected. The part lifecycle platform 106 may identify a trend when the frequency and/or the number of times exceeds a threshold amount of occurrences for the corresponding combination of variables within the additional information and the indications of the parts that need to be serviced, such as the various locations.

Figure 5:
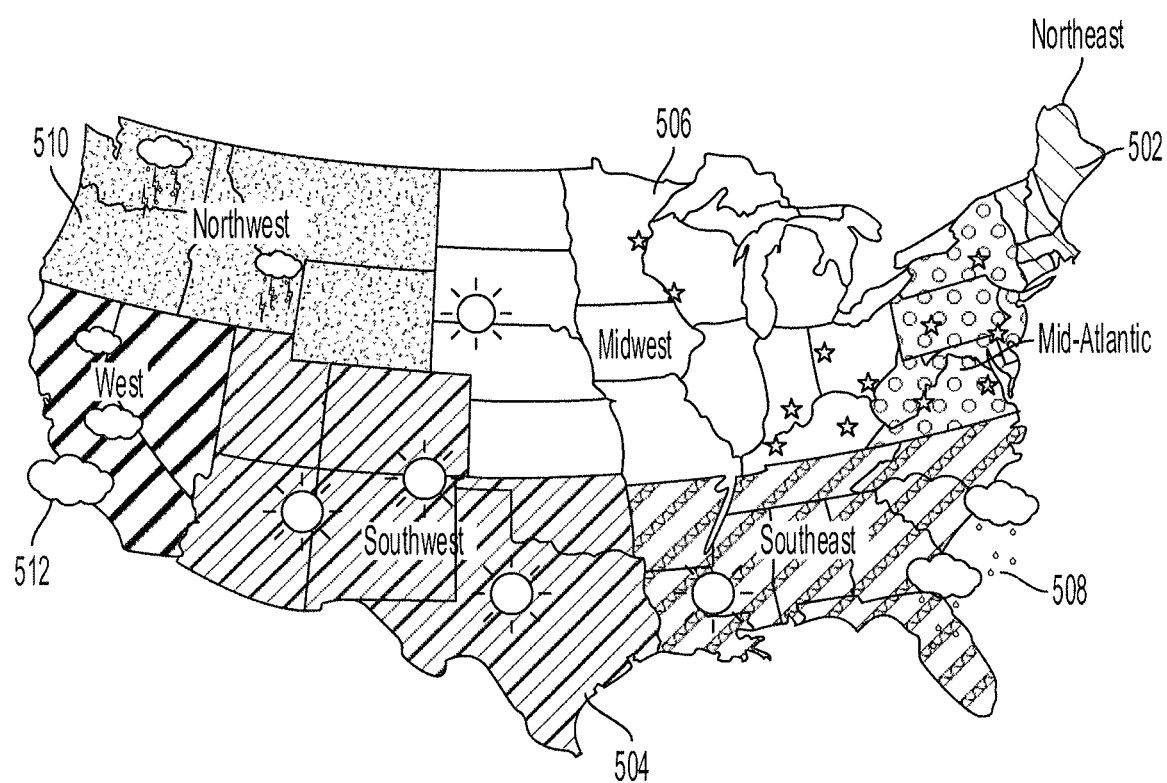
FIG. 5 shows an illustration of different weather patterns throughout the United States that affect the performance and lifecycle of one or more parts being serviced using the part lifecycle system of FIG. 1 according to an aspect of the invention.

For example, the part lifecycle platform 106 may identify that multiple parts throughout their lifecycle, such as the suspension system or the wheels of the vehicle 102*a*, of multiple vehicles have an inordinate amount of rust for the age of the parts and that the multiple vehicles are generally in the Northeast 502 when a threshold percentage of those parts for those vehicles 102*a-b* show the degradation in their lifecycle. Moreover, the part lifecycle platform 106 may determine that those vehicles 102*a-b* that are more susceptible to rust on those parts are in the Northeast 502 when the density of vehicles 102*a-b* with rusted parts is greater than the density of vehicles 102*a-b* with rusted parts in other regions. This may because there is a larger amount of snowfall in the Northeast 502, as shown in FIG. 5, for example.

In another example, the part lifecycle platform 106 may identify that multiple parts have different performances, such as the engine, in different regions. The part lifecycle platform 106 may determine from the aggregated data that multiple parts, such as the engine 124 or the compressor, of multiple vehicles operate at a generally higher temperature or must pump more refrigerant to cool the vehicle 102*a-b* because a threshold percentage of the vehicles 102*a-b* in the region, such as in the Southwest 504, operate at the generally higher temperature or require an increased amount of refrigerant flow to cool the vehicle 102*a-b*. This may be because the weather in the region, such as the Southwest 504, is dry and hot.

Once the correlations, relationships, patterns and/or trends are determined, the part lifecycle platform 106 may update the part profile for a part based on the correlations, relationships, patterns and/or trends (406). For example, the part lifecycle platform 106 may determine that the lifecycle of certain parts, such as the suspension system and the wheels, degrade faster in the Northeast 502 because of the rust, and thus, may determine that the lifecycle of those parts is less for vehicles 102*a-b* in the Northeast 502 than in the Southwest 504 where the weather is dry and sunny. In response, the part lifecycle platform 106 may change the required service of the wheel from every 50,000 miles to every 35,000 miles or other part based on the general frequency of when the wheel for the vehicle 102*a-b* needs to be serviced in the Northeast 502.

Similarly, in another example, the part lifecycle platform 106 may determine that the normal operating range of the performance of certain parts, such as the engine 124, operate at a different temperature in the Southwest 504, where the weather is hot and sunny, than in the Northeast 502, where the weather is cold. The engine 124 may operate at above 80 degrees Fahrenheit in the South 504, whereas the engine 124 may operate below 70 degrees Fahrenheit in the Northeast 502, for example. Moreover, the compressor may more regularly be put to use in the South 504 than in the Northeast 502 to cool the vehicle 102*a-b*, and thus, may have a shorter lifecycle and require more service due to its constant use. In response, the part lifecycle platform 106 may change the operational range for the part based on the region.

In other examples, the different seasons in the Midwest 506 and the humidity in the Southeast 508 and the Northwest 510 may affect the performance and/or lifecycle of various parts for various vehicles 102*a-b*. The part lifecycle platform 106 may identify the affect by analyzing the relationships, trends and/or patterns of the additional information and indications of a part that needs to be serviced. Parts of vehicles 102*a-b* in the West 512, on the other hand, may last longer and perform better than other parts of the United States because the weather in the West 512 is generally constant throughout the year. As a result, the part lifecycle platform 106 may have less tolerance for changes in performance of the parts and/or may require that a part be serviced less than other areas of the United States.

The part lifecycle platform 106 may determine the part profile for all parts of the vehicle 102*a-b* and use the multiple part profiles to estimate the value of the part and/or the vehicle 102*a-b* (408). Since the part lifecycle platform 106 has a part profile that describes the condition e.g., expected performance and expected lifecycle, along with a service record of each part of the vehicle 102*a*, the part lifecycle platform 106 may more accurately estimate the actual value of the part. Then, the part lifecycle platform 106 may more accurately estimate the value of the vehicle 102*a* based on the value of the parts, e.g., by summing the value of each part of the vehicle 102*a* and coalescing the summed value with an expected market value of the vehicle 102*a* obtained via user input or from a database. This provides a better estimated value for the vehicle 102*a-b* to be used at trade-in, sale and/or for insurance claims. For example, a vehicle 102*a* with many new parts, such as a windshield, an HVAC unit, or a new transmission, may be valued more than a similar vehicle with the same mileage but with old parts or parts that are worn due to wear and tear.

Once the part profile is updated, which indicates the expected performance of the part and the expected lifecycle of the part, the part lifecycle platform 106 may provide the part profile to the part lifecycle apparatus 104 and/or service provider 108 (410). The part lifecycle platform 106 may also provide the estimated value of the vehicle 102*a-b*.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A part lifecycle apparatus, comprising:
   a non-transitory memory configured to store a plurality of part profiles including a first part profile for a first part of a vehicle, the first part profile including an operational range of performance values or a life expectancy associated with the first part;
a sensor configured to detect sensor data and to determine performance data or lifecycle data of the first part of the vehicle; and
an electronic control unit coupled to the non-transitory memory and the sensor and configured to:
determine a baseline performance or a baseline lifecycle of the first part based on the first part profile,
determine, based on the sensor data, a driver behavior related to operation of the vehicle,
modify, based on the determined driver behavior, the operational range of performance values or the life expectancy associated with the first part,
update, based on the modified operational range of performance values or the modified life expectancy associated with the first part, the determined baseline performance or the determined baseline lifecycle of the first part,
determine that the performance data or the lifecycle data exceeds a threshold related to the updated baseline performance or the updated baseline lifecycle of the first part, respectively, and
provide an indication to a user that the first part needs maintenance when the performance data or the lifecycle data exceeds the threshold.

2. The part lifecycle apparatus of claim 1, further comprising:
a second sensor configured to measure or detect performance data or lifecycle data of a second part, and
wherein:
the plurality of part profiles include a second part profile for the second part, and
the electronic control unit is coupled to the second sensor and further configured to:
determine that the measured or detected performance data or the measured or detected lifecycle data of the second part exceeds a second threshold based on a baseline performance or a baseline lifecycle of the second part; and
provide a second indication to the user that the second part needs maintenance.

3. The part lifecycle apparatus of claim 1, wherein the electronic control unit is further configured to:
provide the indication that the first part needs maintenance to a service provider; and
cause the service provider to order the first part or schedule an appointment for the user.

4. The part lifecycle apparatus of claim 3, wherein the electronic control unit is further configured to:
determine driver behavior patterns of a driver of the vehicle; and
provide additional information including a location of the vehicle and the driver behavior patterns of the driver of the vehicle to the service provider.

5. The part lifecycle apparatus of claim 1, wherein:
the lifecycle data includes an age of the first part, and
the baseline lifecycle includes a replacement age for the first part.

6. The part lifecycle apparatus of claim 5, wherein the electronic control unit is further configured to determine that the age of the first part is greater than or equal to the replacement age for the first part.

7. The part lifecycle apparatus of claim 1, wherein:
the performance data includes a temperature, an air pressure, or a rate or speed of the first part, and
the baseline performance includes a temperature range, an air pressure range, or a rate or speed range of the first part.

8. The part lifecycle apparatus of claim 7, wherein the electronic control unit is further configured to determine that the temperature, the air pressure, or the rate or speed of the first part exceeds the temperature range, the air pressure range, or the rate or speed range, respectively, of the first part.

9. A method for maintaining parts of a vehicle, comprising:
determining, by an electronic control unit using a sensor configured to detect sensor data, performance data or lifecycle data of a first part of the vehicle;
determining, by the electronic control unit, a baseline performance or a baseline lifecycle of the first part based on a first part profile, the first part profile including an operational range of performance values or a life expectancy associated with the first part;
determining, by the electronic control unit and based on the sensor data, a driver behavior related to operation of the vehicle;
adjusting, by the electronic control unit and based on the determined driver behavior, the operational range of performance values or the life expectancy associated with the first part;
updating, by the electronic control unit and based on the adjusted operational range of performance values or the adjusted life expectancy associated with the first part, the determined baseline performance or the determined baseline lifecycle of the first part;
determining, by the electronic control unit, that the performance data or the lifecycle data exceeds a threshold related to the updated baseline performance or the updated baseline lifecycle of the first part, respectively; and
providing, by the electronic control unit and in response to the performance data or the lifecycle data exceeding the threshold, an indication to a user that the first part needs maintenance.

10. The method of claim 9, wherein determining that the lifecycle data exceeds the threshold includes determining that an age of the first part is greater than or equal to a replacement age for the first part.

11. The method of claim 9, wherein determining that the performance data exceeds the threshold includes determining that a temperature, an air pressure, or a rate or speed of the first part exceeds a temperature range, an air pressure range, or a rate or speed range, respectively, of the first part.

12. The method of claim 9, further comprising:
measuring or detecting, by the electronic control unit using the sensor, performance data or lifecycle data of a second part of the vehicle;
determining, by the electronic control unit, that the measured or detected performance data or the measured or detected lifecycle data of the second part exceeds a second threshold based on a baseline performance or a baseline lifecycle of the second part; and
providing, by the electronic control unit, a second indication to the user that the second part needs maintenance.

13. The method of claim 12, further comprising:
providing, by the electronic control unit, the indication and the second indication to a service provider; and
providing, by the electronic control unit, additional information including a location of the vehicle, vehicle identification information, and driver behavior patterns of a driver of the vehicle to the service provider.

14. The method of claim 13, further comprising:
determining, by a processor of a part lifecycle system, a relationship among the indication, the second indication, the additional information, and the driver behavior patterns of the driver.

15. The method of claim 14, further comprising:
determining, by the processor of the part lifecycle system, that there is a defect based on the relationship; and
alerting, by the processor of the part lifecycle system, the service provider about the defect.

16. A part lifecycle system, comprising:
a non-transitory memory configured to store a plurality of indications of a plurality of parts of a vehicle that need to be replaced; and
a processor coupled to the non-transitory memory and configured to:
  obtain a driver behavior related to operation of the vehicle,
  obtain the plurality of indications of the plurality of parts that need to be replaced, at least one of the plurality of indications being related to a part profile including an operational range of performance values or a life expectancy associated with at least one of the plurality of parts,
  determine a relationship or pattern among the plurality of indications and the driver behavior,
  update the part profile based on the relationship or pattern among the plurality of indications and the driver behavior,
  diagnose a maintenance or design issue based on the relationship or pattern among the plurality of indications, the driver behavior, and the updated part profile, and
  provide the diagnosis to a service provider or a user.

17. The part lifecycle system of claim 16, wherein the processor is further configured to:
estimate a value of the vehicle based on the updated part profile.

18. The part lifecycle system of claim 17, wherein the processor is further configured to sum an estimated value of each part of the vehicle to estimate the value of the vehicle.

19. The part lifecycle system of claim 16, wherein the processor is further configured to:
collect additional information including a location of the vehicle along with the plurality of indications; and
determine the relationship or pattern among the plurality of indications further based on the additional information.

20. The part lifecycle system of claim 19, wherein the processor is further configured to determine driver behavior patterns based on the driver behavior and the additional information.

* * * * *